Nov. 1, 1949. E. NASSIMBENE 2,486,669
METAL FOIL COVERING FOR REPAIR MATERIAL
Filed Sept. 2, 1947
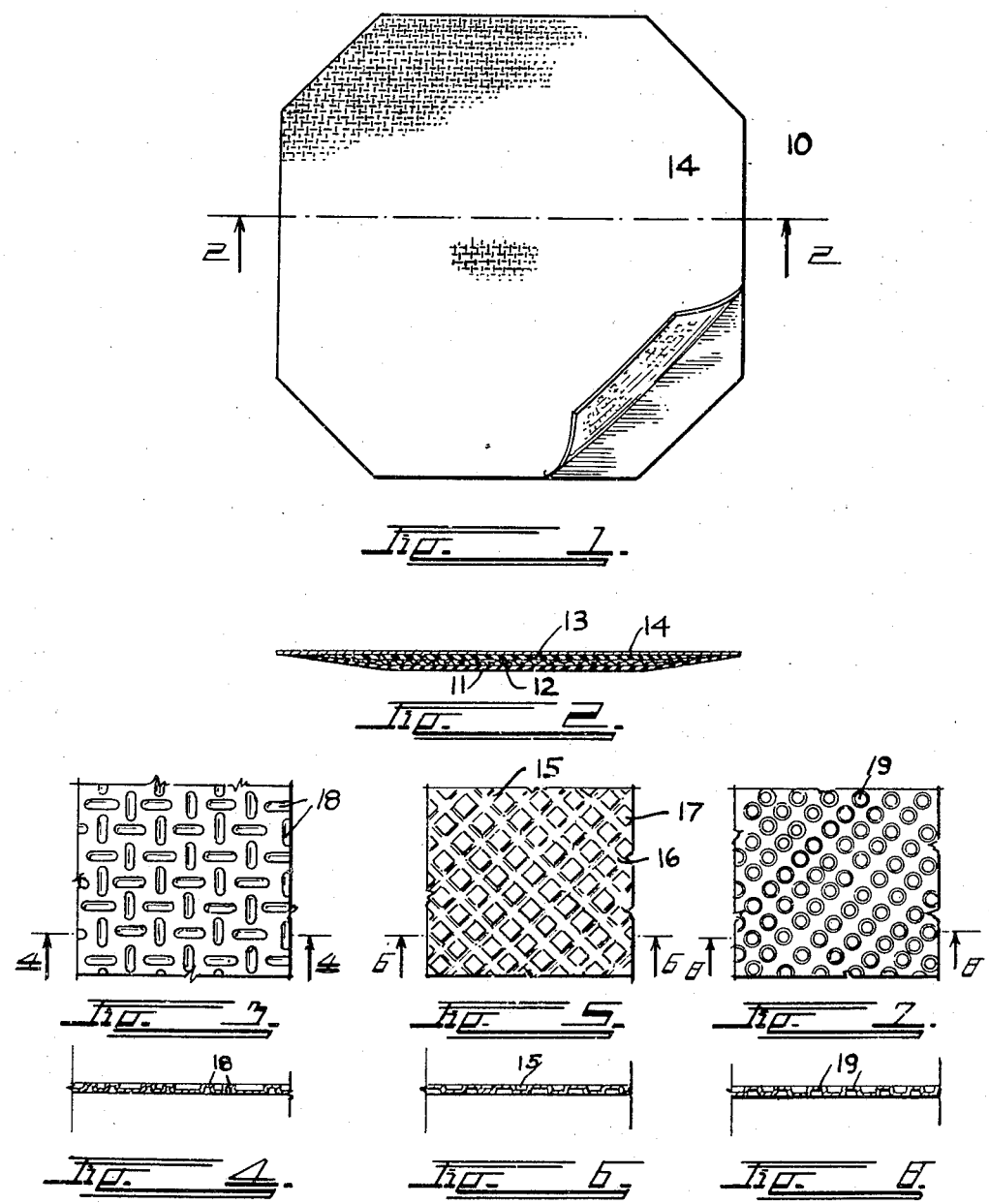
INVENTOR.
ERNEST NASSIMBENE.
BY
Martin E. Anderson
ATTORNEY.

UNITED STATES PATENT OFFICE 2,486,669

METAL FOIL COVERING FOR REPAIR MATERIAL

Ernest Nassimbene, Denver, Colo., assignor to Gates Rubber Company, Denver, Colo., a corporation of Colorado Application September 2, 1947, Serial No. 771,812

1 Claim. (Cl. 154—55)

This invention relates to improvements in rubber repair material, such as tire and tube repair patches and camelback.

Manufacturers of rubber goods, such as tires and tubes, also manufacture and sell repair materials, such as patches for repairing tire casings and inner tubes and camelback for retreading tires.

Repair material like that mentioned above is provided on one or both sides with a layer of unvulcanized material compounded so as to give the proper consistency when cured. The surface of the unvulcanized material is also tacky.

It is customary to cover the tacky surface with a layer of "Holland cloth" or "cambric." Such materials protect the surface from dirt and keep it clean, but do not protect the tacky unvulcanized surface against the chemical action due to contact with air. "Holland cloth" breaks when subjected to strains like those produced when the material is curved sharply so as to leave the "Holland cloth" on the convex surface. If and when the material is bent so as to position the "Holland cloth" on the inner or concave surface, it will wrinkle leaving openings into which air may freely enter.

It has been found that when such repair material is covered with a metal foil, preferably an aluminum foil, the surface thus covered will be fully protected against the oxidizing action of the air.

United States application Serial No. 703,996, filed October 18, 1946, now abandoned, and assigned to the present assignee, relates to the substitution of a smooth, metal foil as a protecting covering for the unvulcanized surface of rubber repair material.

Experience has shown that a smooth metal foil protective covering is effective so long as it remains untorn and in close contact with the surface. Due to the unyielding character of a metal foil of the thickness used, it frequently tears when the material is curved so as to bring it on the convex side and will wrinkle when the curvature brings it on the concave side.

Metal foil, aside from the objections just pointed out, is very effective and suitable for this purpose because: (a) it is inert and does not react chemically with rubber; (b) its low permeability to air protects the rubber from oxidation and loss of tack; (c) it can be easily removed from the uncured rubber; (d) aluminum due to its inertness and low permeability, also to its opaqueness, preserves the desirable properties of the material almost indefinitely; (e) the use of such a metal foil covering also increases the product appeal.

The object of this is to produce a covering that has all of the advantages of the smooth foil and in addition avoids the objection of tearing and wrinkling.

The above object is attained by the simple expedient of corrugating the foil in angularly related lines, or in other ways displacing the foil surfaces so that it will yield without tearing when subjected to tearing strains or forces, and which, in addition, will not wrinkle when the material is curved to bring the foil on the inside.

In order to more clearly describe the invention and its advantages, reference will be had to the accompanying drawing in which it has been illustrated, and in which:

Figure 1 is a plan view of a repair patch showing the metal foil in place thereon;

Figure 2 is a section taken on line 2—2, Figure 1, the thickness being exaggerated relative to its width;

Figures 3 and 4, 5 and 6 and 7 and 8 are respectively plan views and sections showing three different foil designs.

Referring now to the drawing, reference numeral 10 designates a tire repair patch constructed in the usual manner. From Figure 2, which is a section and which has been purposely exaggerated as to thickness, it will be seen that the specific tire patch illustrated comprises a layer 11 of vulcanized rubber, one or two layers 12 of rubberized fabric and a layer 13 of unvulcanized rubber composition having a tacky outer surface. Reference numeral 14 designates the protective metal foil cover to which this invention relates.

At this point attention is directed to the fact that the repair material illustrated is a tire patch, as above stated, but the invention is in nowise restricted or limited to this kind of material and is equally applicable to what is designated camelback or any other type of material having both surfaces provided with unvulcanized rubber composition.

Covering 14 is a metal foil having a thickness of from .002 to .005 of an inch, which is the same thickness as is used when plain metal foil is employed. Foil 14 has its surface deformed in any suitable manner, either by angularly related corrugations like that shown in Figures 5 and 6 where reference numeral 15 designates a groove pressed into the metal by means of a roller, or some other suitable means and reference numeral 16 represents similar grooves extending at right angles to grooves 15. The spaces 17 between the grooves are substantially rectangular when constructed in the manner just described and shown in Figures 5 and 6. However, the foil may be made in other ways, as, for example, like that shown in Figure 3 where certain portions are pressed upwardly or downwardly, leaving elevated areas 18 as shown in Figures 3 and 4, or the surface may be provided with round or conical projections 19 arranged in lines somewhat as shown in Figure 7 or 8.

It is to be understood that the specific designs shown and described are merely illustrative. The idea, as above intimated, is to produce a foil that will yield to deforming strains that would tear a smooth foil.

By corrugating or otherwise deforming the surface of the foil, it allows it to fit the contour of the repair material more closely than a smooth foil can fit, especially if the surface is irregular. A corrugated foil will yield sufficiently to prevent tearing when the material is bent so as to position the foil on the convex surface. The corrugations or deformations will also prevent wrinkling of the foil when the material is bent so as to bring it on the concave side of the material. A corrugated foil will not retain creases permanently, due to bending or crushing of the material to which it is attached. Such foil is also more readily removed from the repair material than the smooth foil.

By far the most important advantage is that the foil, when corrugated, will not break or tear when the material is bent so as to make the protective surface convex. In addition to the advantages above pointed out, the corrugated foil also gives the material a greater product appeal.

In this specification and in the claim, the terms "corrugated" or "corrugations" have been used in a sense broad enough to include designs such as those shown in Figures 3, 4, 7 and 8 as well as that shown in Figures 5 and 6. Although it is believed that transverse corrugations are most desirable, a foil corrugated one way only possesses the necessary characteristics, although in a slightly smaller degree. It is evident that if the foil is corrugated in one way only, it will readily stretch or compress in response to forces acting at right angles to the line of corrugation. Such foil will also yield to a greater extent than a smooth foil, to forces acting in the line of the corrugations because the material has an opportunity to flatten which prevents the strains from increasing to a point sufficiently to tear.

This invention has been illustrated and described with special reference to tire repair patches which have, as a rule, a single tacky surface. Some repair material such as camelback has both side surfaces tacky and are therefore provided with a protective foil covering on both sides.

Having described the invention what is claimed as new is:

In a rubber repair article formed from a flexible sheet composed principally of rubber having at least one side formed from a layer of unvulcanized rubber having a tacky surface and a protective covering on said tacky surface, said covering comprising a thin flexible metal foil of nonplanar shape having a multiplicity of closely spaced and uniformly distributed protuberances, portions of said foil being in contact with said tacky surface and other portions being spaced therefrom, whereby the foil covers said tacky surface without tearing when the sheet is flexed in any direction.

ERNEST NASSIMBENE.

REFERENCES CITED

The following references are of record in the file of this patent:

UNITED STATES PATENTS

| Number | Name | Date |
|---|---|---|
| 1,823,278 | Martin | Sept. 15, 1931 |
| 2,157,183 | Mullen | May 9, 1939 |